United States Patent
Akkarakaran et al.

(10) Patent No.: US 10,548,153 B2
(45) Date of Patent: Jan. 28, 2020

(54) METHODS AND APPARATUS FOR SUPPORTING FREQUENCY DIVISION MULTIPLEXING OF MULTIPLE WAVEFORMS

(71) Applicant: QUALCOMM Incorporated, San Diego, CA (US)

(72) Inventors: Sony Akkarakaran, Poway, CA (US); Tao Luo, San Diego, CA (US); Jing Sun, San Diego, CA (US); Rahul Malik, San Diego, CA (US); Tamer Kadous, San Diego, CA (US); Akula Reddy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 15/910,710

(22) Filed: Mar. 2, 2018

(65) Prior Publication Data
US 2018/0288781 A1    Oct. 4, 2018

Related U.S. Application Data

(60) Provisional application No. 62/481,649, filed on Apr. 4, 2017.

(51) Int. Cl.
| | |
|---|---|
| *H04W 72/12* | (2009.01) |
| *H04J 1/02* | (2006.01) |
| *H04L 5/00* | (2006.01) |
| *H04W 72/04* | (2009.01) |
| *H04L 27/26* | (2006.01) |

(52) U.S. Cl.
CPC .............. *H04W 72/12* (2013.01); *H04J 1/02* (2013.01); *H04L 5/0044* (2013.01);
(Continued)

(58) Field of Classification Search
CPC .............. H04W 72/12; H04W 72/042; H04W 72/0446; H04L 5/0044; H04L 5/0053;
(Continued)

(56) References Cited

U.S. PATENT DOCUMENTS

2018/0192383 A1*  7/2018  Nam .................. H04W 56/001
2018/0279289 A1*  9/2018  Islam ................. H04W 72/048

OTHER PUBLICATIONS

Huawei et al., "sPDCCH Multiplexing with Data", 3GPP DRAFT; R1-1704265, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2014-Apr. 7, 2014 Mar. 25, 2017, XP051251074, Retrieved from the Internet: URL: http://www .3gpp.org/ftp/tsg_ran/WG1_RL1/TSGR1_88b/Docs/ [retrieved on Mar. 25, 2017], 6 pages.
(Continued)

*Primary Examiner* — Thai Nguyen
(74) *Attorney, Agent, or Firm* — Loza & Loza, LLP

(57) ABSTRACT

Aspects of the disclosure relate to methods and apparatus of wireless communication to support frequency division multiplexing (FDM) of multiple waveforms. The methods and apparatus schedule FDM symbols where the scheduling of the FDM symbols is selectively based on one or more waveform parameters during a time interval when the FDM symbols are transmitted. The FDM symbols are then transmitted over the time interval. Further aspects also include the reception of the FDM symbols in a receiver where the waveform parameters are applied for decoding based on the waveform parameters.

14 Claims, 13 Drawing Sheets

(52) U.S. Cl.
CPC .......... *H04L 5/0048* (2013.01); *H04L 5/0053* (2013.01); *H04L 27/2614* (2013.01); *H04W 72/042* (2013.01); *H04W 72/0446* (2013.01); *H04L 27/2602* (2013.01)

(58) Field of Classification Search
CPC ............... H04L 27/2614; H04L 5/0048; H04L 27/2602; H04J 1/02
See application file for complete search history.

(56) References Cited

OTHER PUBLICATIONS

Intel Corporation: "Mini-Slot Length and Start Time for URLLC", 3GPP DRAFT; R1-1700380 INTEL-URLLC_MINISLOT, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017 Jan. 16, 2017, XP051207917, Retrieved from the Internet: URL:http://www.3gpp.org/ftp/Meetings_3GPP SYNC/RAN1/Docs/ [retrieved on Jan. 16, 2017], 4 pages.

International Search Report and Written Opinion—PCT/US2018/020980—ISA/EPO—dated Jun. 4, 2018.

SAMSUNG: "Multiplexing between Data and Control", 3GPP DRAFT; R1-1705384 Multiplexing between Data and Control, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017 Mar. 24, 2017, XP051250681, Retrieved from the Internet: URL:http://www.3gpp.org/ftp/tsg_ran/WG1_RL1/TSGR1_88b/Docs/ [retrieved on Mar. 24, 2017], 6 pages.

* cited by examiner

METHODS AND APPARATUS FOR SUPPORTING FREQUENCY DIVISION MULTIPLEXING OF MULTIPLE WAVEFORMS

PRIORITY CLAIM

This application claims priority to and the benefit of provisional U.S. Provisional Patent Application No. 62/481,649 filed in the U.S. Patent and Trademark Office on Apr. 4, 2017, the entire content of which is incorporated herein by reference as if fully set forth below in its entirety and for all applicable purposes.

TECHNICAL FIELD

The technology discussed herein relates generally to wireless communication systems, and more particularly, to methods and apparatus for supporting Frequency Division Multiplexing (FDM) transmissions of multiple waveforms, and low peak-to-average power ratio (PAPR) waveforms in particular.

INTRODUCTION

In particular wireless technologies and standards such as the evolving 3GPP 5G New Radio (NR) standard, particular high frequency transmission waveforms and protocols have been proposed. For example, NR specifications are expected to utilize orthogonal frequency division multiplexing (OFDM) as the transmission waveform for downlink (DL) transmissions for enhanced mobile broadband (eMBB), and for millimeter wave (mmWave) with carrier frequencies less than 40 GHz. However, as even higher RF carrier frequencies above 40 GHz begin to be utilized, the peak-to-average power ratio (PAPR) of such wireless transmissions becomes more important. Thus, it may become advantageous to use other waveforms for DL transmissions that afford lower PAPRs at these higher frequencies, such as Discrete Fourier Transform spread OFDM (DFT-S-OFDM). Of note, however, frequency division multiplexing (FDM) transmission of multiple low-PAPR waveforms through the same power amplifier (PA) results in the loss of this PAPR advantage relative to OFDM waveforms.

Accordingly, it may be advantageous to devise new scheduling modes to support more efficient FDM transmissions of multiple waveforms.

Definitions

RAT: radio access technology. The type of technology or communication standard utilized for radio access and communication over a wireless air interface. Just a few examples of RATs include GSM, UTRA, E-UTRA (LTE), Bluetooth, and Wi-Fi.

NR: new radio. Generally refers to 5G technologies and the new radio access technology undergoing definition and standardization by 3GPP in Release 15.

Legacy compatibility: may refer to the capability of a 5G network to provide connectivity to pre-5G devices, and the capability of 5G devices to obtain connectivity to a pre-5G network.

mmWave: millimeter-wave. Generally refers to high frequency bands above 24 GHz, which can provide a very large bandwidth.

Beamforming: directional signal transmission or reception. For a beamformed transmission, the amplitude and phase of each antenna in an array of antennas may be precoded, or controlled to create a desired (i.e., directional) pattern of constructive and destructive interference in the wavefront.

MIMO: multiple-input multiple-output. MIMO is a multi-antenna technology that exploits multipath signal propagation so that the information-carrying capacity of a wireless link can be multiplied by using multiple antennas at the transmitter and receiver to send multiple simultaneous streams. At the multi-antenna transmitter, a suitable precoding algorithm (scaling the respective streams' amplitude and phase) is applied (in some examples, based on known channel state information). At the multi-antenna receiver, the different spatial signatures of the respective streams (and, in some examples, known channel state information) can enable the separation of these streams from one another.

1. In single-user MIMO, the transmitter sends one or more streams to the same receiver, taking advantage of capacity gains associated with using multiple Tx, Rx antennas in rich scattering environments where channel variations can be tracked.

2. The receiver may track these channel variations and provide corresponding feedback to the transmitter. This feedback may include channel quality information (CQI), the number of preferred data streams (e.g., rate control, a rank indicator (RI)), and a precoding matrix index (PMI).

Massive MIMO: a MIMO system with a very large number of antennas (e.g., greater than an 8×8 array).

AS: access stratum. A functional grouping consisting of the parts in the radio access network and in the UE, and the protocols between these parts being specific to the access technique (i.e., the way the specific physical media between the UE and the radio access network is used to carry information).

NAS: non-access stratum. Protocols between UE and the core network that are not terminated in the radio access network.

RAB: radio access bearer. The service that the access stratum provides to the non-access stratum for transfer of user information between a UE and the core network.

Network slicing: a wireless communication network may be separated into a plurality of virtual service networks (VSNs), or network slices, which are separately configured to better suit the needs of different types of services. Some wireless communication networks may be separated according to eMBB, IoT, and URLLC services.

eMBB: enhanced mobile broadband. Generally, eMBB refers to the continued progression of improvements to existing broadband wireless communication technologies such as LTE. eMBB provides for (generally continuous) increases in data rates and increased network capacity.

URLLC: ultra-reliable and low-latency communication. Sometimes equivalently called mission-critical communication. Reliability refers to the probability of success of transmitting a given number of bytes within 1 ms under a given channel quality. Ultra-reliable refers to a high target reliability, e.g., a packet success rate greater than 99.999%. Latency refers to the time it takes to successfully deliver an application layer packet or message. Low-latency refers to a low target latency, e.g., 1 ms or even 0.5 ms (in some examples, a target for eMBB may be 4 ms).

Duplex: a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and interference cancellation techniques. Full duplex emulation is frequently implemented for wireless links by utilizing frequency division duplex (FDD) or time division duplex (TDD). In FDD, the transmitter and receiver at each endpoint operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction.

OFDM: orthogonal frequency division multiplexing. An air interface may be defined according to a two-dimensional grid of resource elements, defined by separation of resources in frequency by defining a set of closely spaced frequency tones or subcarriers, and separation in time by defining a sequence of symbols having a given duration. By setting the spacing between the tones based on the symbol rate, inter-symbol interference can be eliminated. OFDM channels provide for high data rates by allocating a data stream in a parallel manner across multiple subcarriers.

CP: cyclic prefix. A multipath environment degrades the orthogonality between subcarriers because symbols received from reflected or delayed paths may overlap into the following symbol. A CP addresses this problem by copying the tail of each symbol and pasting it onto the front of the OFDM symbol. In this way, any multipath components from a previous symbol fall within the effective guard time at the start of each symbol, and can be discarded.

Scalable numerology: in OFDM, to maintain orthogonality of the subcarriers or tones, the subcarrier spacing is equal to the inverse of the symbol period. A scalable numerology refers to the capability of the network to select different subcarrier spacings, and accordingly, with each spacing, to select the corresponding symbol period and cyclic prefix duration. The symbol period should be short enough that the channel does not significantly vary over each period, in order to preserve orthogonality and limit inter-subcarrier interference.

RSMA: resource spread multiple access. A non-orthogonal multiple access scheme generally characterized by small, grantless data bursts in the uplink where signaling over head is a key issue, e.g., for IoT.

QoS: quality of service. The collective effect of service performances which determine the degree of satisfaction of a user of a service. QoS is characterized by the combined aspects of performance factors applicable to all services, such as: service operability performance; service accessibility performance; service retainability performance; service integrity performance; and other factors specific to each service.

RS: reference signal. A predefined signal known a priori to both transmitters and receivers and transmitted through the wireless channel, and used for, among other things, for channel estimation of the wireless channel and coherent demodulation at a receiver.

DMRS: Demodulation reference signal. A predefined signal known a priori to both transmitters and receivers and transmitted through the wireless channel signal typically in UL transmissions that is used for channel estimation and for coherent demodulation.

CSI-RS: Channel State Information-Reference Signal. A reference signal sent on the DL and used by the UE to estimate the channel and report channel quality information (CQI) to the Node B.

pBCH: Physical Broadcast Channel. A broadcast channel used to transmit parameters used for initial access of a cell such as downlink system bandwidth and System Frame Number, and may include the use of a master information block (MIB) to transmit the parameters PSS/SSS/TSS: Primary Synchronization signal/Secondary Synchronization signal/Tertiary Synchronization Signal. Synchronization signals that are used by a UE to acquire a DL signal from an eNB or gNB, and are typically read prior to reading the pBCH.

Slot: In 5G NR, a slot is defined as a duration of a y number of OFDM symbols in the numerology used for transmission, where the number y is 14 symbols as an example.

Minislot: In 5G NR, a minislot may represent as smallest possible scheduling unit within a slot and has a support transmission shorter than a y number of OFDM symbols in the numerology used for transmission. The mini-slot can be used as the basic scheduling unit within the slot and may even be one OFDM symbol.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

According to an aspect, a method of wireless communication is disclosed that includes scheduling frequency division multiplexed (FDM) symbols, wherein the scheduling of the FDM symbols is selectively based on one or more waveform parameters during a time interval when the FDM symbols are transmitted. Additionally, the method includes transmitting the FDM symbols over the time interval.

According to another aspect, an apparatus for wireless communication, is disclosed. The apparatus includes means for scheduling frequency division multiplexed (FDM) symbols, wherein the means for scheduling is configured to selectively schedule the FDM symbols based on one or more waveform parameters during a time interval when the FDM symbols are transmitted. Further, the apparatus includes means for transmitting the FDM symbols over the time interval.

In yet another aspect of the present disclosure, an apparatus for wireless communication is disclosed including a processor, a transceiver communicatively coupled to the at least one processor; and a memory communicatively coupled to the at least one processor. The processor is configured to schedule frequency division multiplexed (FDM) symbols, wherein the scheduling of the FDM symbols is selectively based on one or more waveform parameters during a time interval when the FDM symbols are transmitted. Further, the processor is configured to transmit the FDM symbols over the time interval with the transceiver.

According to still another aspect of the present disclosure, a method of wireless communication includes receiving in a receiver scheduled frequency division multiplexed (FDM) symbols where the FDM symbols are scheduled selectively based on one or more waveform parameters during the time interval when the FDM symbols are transmitted by a transmitter. The method also includes applying the waveform parameters for decoding of FDM symbols in the receiver.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In the following disclosure, the present methods and apparatus provide new scheduling modes to support efficient FDM of multiple waveforms such as low PAPR waveforms. In particular, the scheduling includes restriction of the range of possible values, parameters, or factors that are known to increase the PAPR for frequency division multiplexed multiple waveforms, as will be discussed in more detail below.

Figure 1:
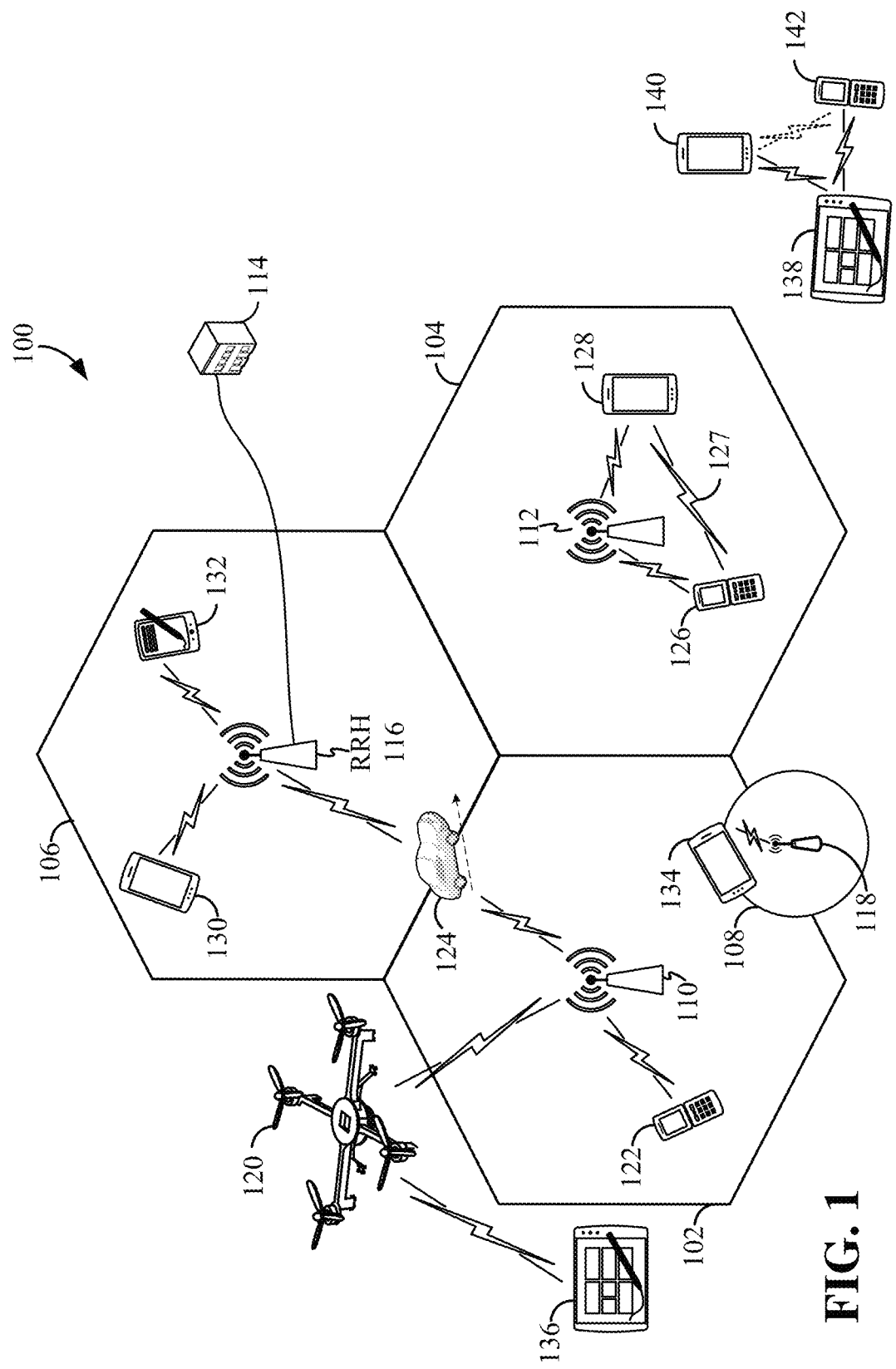
FIG. 1 is a conceptual diagram illustrating an example of a radio access network.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells. Transmissions from a base station (e.g., base station 110) to one or more UEs (e.g., UEs 122 and 124) may be referred to as downlink (DL) transmission, while transmissions from a UE (e.g., UE 122) to a base station may be referred to as uplink (UL) transmissions. In accordance with certain aspects of the present disclosure, the term downlink may refer to a point-to-multipoint transmission originating at a scheduling entity 202. Another way to describe this scheme may be to use the term broadcast channel multiplexing. In accordance with further aspects of the present disclosure, the term uplink may refer to a point-to-point transmission originating at a scheduled entity 204.

In some examples, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

In the radio access network 100, the ability for a UE to communicate while moving, independent of its location, is referred to as mobility. The various physical channels between the UE and the radio access network are generally set up, maintained, and released under the control of a mobility management entity (MME). In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
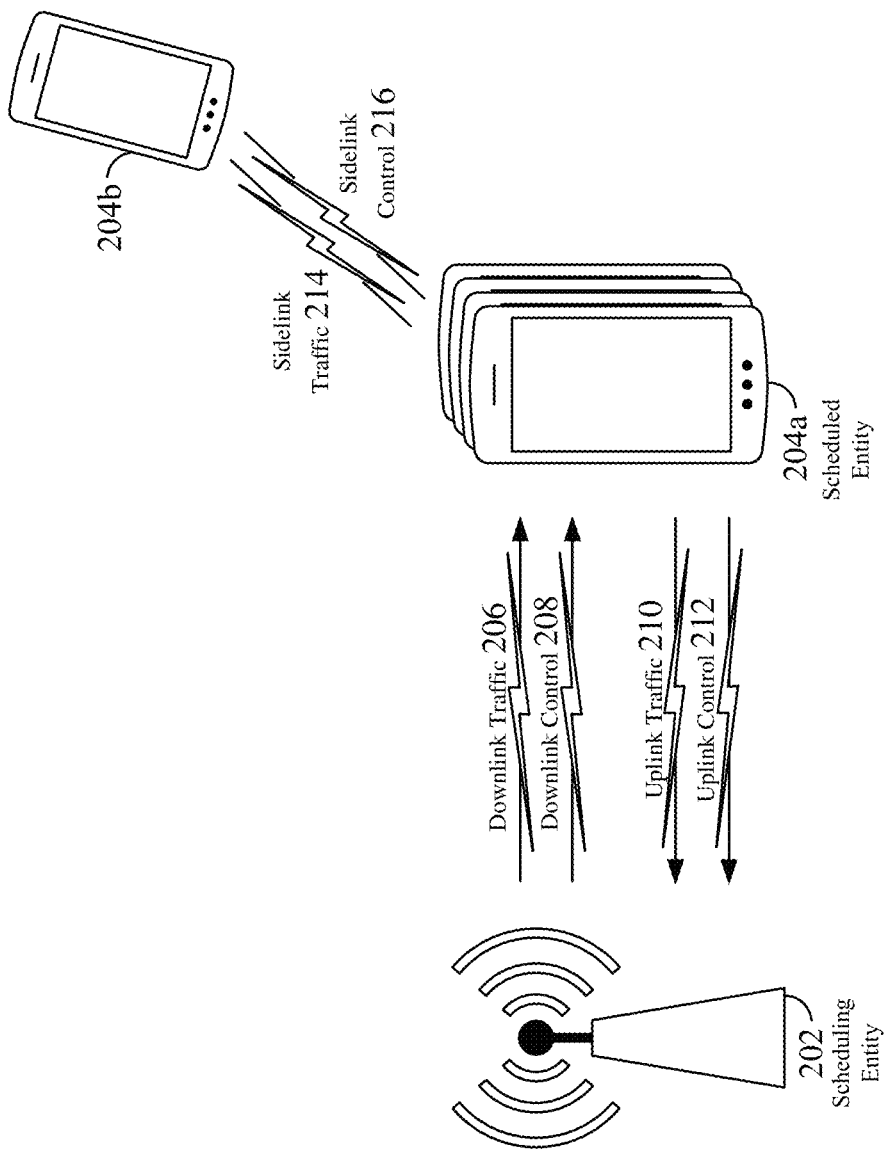
FIG. 2 is a block diagram conceptually illustrating an example of a scheduling entity communicating with one or more scheduled entities according to some embodiments.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). Broadly, the scheduling entity 202 is a node or device responsible for scheduling traffic in a wireless communication network, including the downlink transmissions and, in some examples, uplink traffic 210 from one or more scheduled entities to the scheduling entity 202. Broadly, the scheduled entity 204 is a node or device that receives scheduling control information, including but not limited to scheduling information (e.g., a grant), synchronization or timing information, or other control information from another entity in the wireless communication network such as the scheduling entity 202.

In some examples, scheduled entities such as a first scheduled entity 204a and a second scheduled entity 204b may utilize sidelink signals for direct D2D communication. Sidelink signals may include sidelink traffic 214 and sidelink control 216. Sidelink control information 216 may in some examples include a request signal, such as a request-to-send (RTS), a source transmit signal (STS), and/or a direction selection signal (DSS). The request signal may provide for a scheduled entity 204 to request a duration of time to keep a sidelink channel available for a sidelink signal. Sidelink control information 216 may further include a response signal, such as a clear-to-send (CTS) and/or a destination receive signal (DRS). The response signal may provide for the scheduled entity 204 to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information 214.

The air interface in the radio access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 100 may additionally utilize one or more multiplexing and multiple access algorithms to enable simultaneous communication of the various devices. For example, 5G NR specifications provide multiple access for uplink (UL) or reverse link transmissions from UEs 122 and 124 to base station 110, and for multiplexing for downlink (DL) or forward link transmissions from base station 110 to one or more UEs 122 and 124, utilizing orthogonal frequency division multiplexing access (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

In order for transmissions over the radio access network 100 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 202 and scheduled entities 204 may include suitable hardware and capabilities (e.g., an encoder, a decoder, and/or a CODEC) to utilize one or more of these channel codes for wireless communication.

Within the present disclosure, a frame refers to a duration of 10 ms for wireless transmissions, with each frame consisting of 10 subframes of 1 ms each. On a given carrier, there may be one set of frames in the UL, and another set of frames in the DL.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
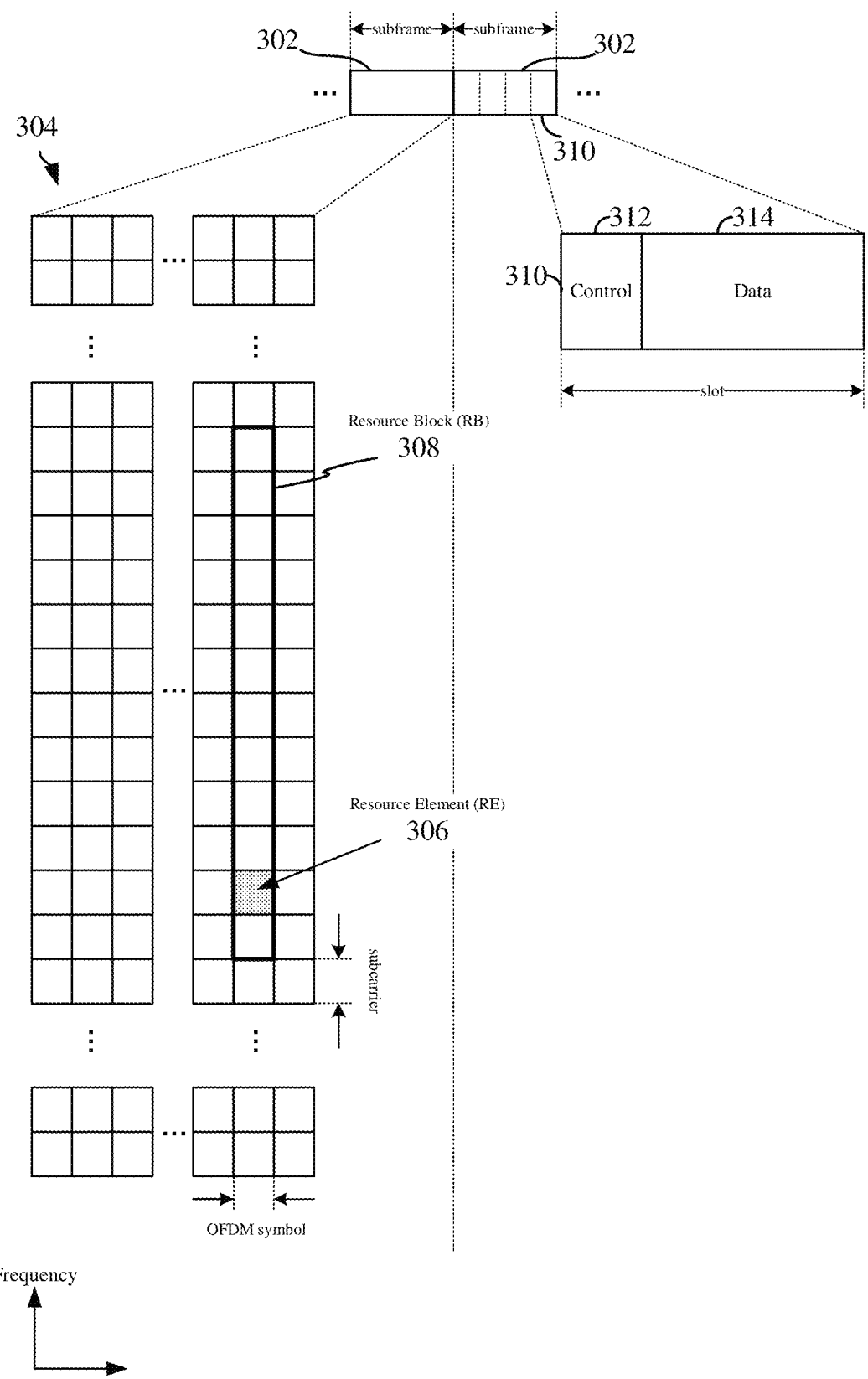
FIG. 3 is a schematic diagram illustrating organization of wireless resources in an air interface utilizing orthogonal frequency divisional multiplexing (OFDM).

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols having the same subcarrier spacing, and with a given cyclic prefix (CP) length. For example, a slot may include 7 or 14 OFDM symbols for the same subcarrier spacing with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a channel state information reference signal (CSI-RS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 202) may allocate one or more REs 306 (e.g., within a control region 312) to carry DL control information 208 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 204) may utilize one or more REs 306 to carry UL control information 212 including one or more UL control channels, such as a physical uplink control channel (PUCCH), to the scheduling entity 202. UL control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above and illustrated in FIGS. 2 and 3 are not necessarily all the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

As discussed above, for DL transmissions at frequencies greater than about 40 GHz, it may be advantageous to consider the use of waveforms other than OFDM, since at these high frequencies, the relatively high PAPR of the OFDM waveform can be disadvantageous. One exemplary waveform with a low PAPR relative to OFDM is DFT-S-OFDM. However, to maintain the capability of multiplexing DL transmissions for large numbers of users, even when utilizing a waveform such as DFT-S-OFDM, the capability to frequency-division multiplex (FDM) multiple such low-PAPR waveforms is desired.

When frequency division multiplexed waveforms are amplified by separate power amplifiers (PAs), there is no PAPR impact as each PA only sees the PAPR of its input. As mentioned before, however, when an FDM transmission of multiple low PAPR waveforms is input to the same power amplifier (PA), this results in the loss of the PAPR advantage afforded by such waveforms (e.g., DFT-S-OFDM waveforms), causing an increase in the PAPR. This increase is detrimental as the PAPR increase results in the need for larger PA backoff to avoid PA saturation/distortion/clipping, which reduces the likelihood that UEs near the cell edge will accurately receive/decode such signals.

It is further recognized that the amount of the PAPR increase may depend on several factors. A first factor is the number of frequency division multiplexed waveforms, where greater numbers correlate to greater PAPR increases. Other factors affecting the PAPR are the rank, modulation order, and bandwidth of each waveform. Yet others factors affecting PAPR include the frequency separation between the frequency division multiplexed waveforms, and the exact waveforms being frequency division multiplexed, where some may adversely affect the PAPR and others may not. As an example, for fixed sequences used for Reference Signals (RS), such as DMRS, specific choices of the sequences as a function of the frequency separation may still preserve the low PAPR property. Yet another factor for which parameter restriction may be helpful involves the scenario of OFDM symbols carrying a synchronization channel, as an example, where the symbols may have a different or variable cyclic-prefix duration compared to those symbols carrying data. Thus, the amount of inter-symbol interference may be different on these two respective types of symbols.

Accordingly, the present structures and methods provide a scheduling of FDM for multiple waveforms (e.g., low PAPR waveforms) that maintains, reduces, or best minimizes the PAPR. In a particular aspect, this scheduling includes restricting or limiting the range of possible values or occurrences of those parameters discussed above for a time duration over which FDM transmissions occur, such as in relation to transmission time intervals (TTIs) or similar transmission duration interval nomenclatures that may be adopted for NR and other 5G systems. It is also noted here that for NR and other 5G systems, a TTI may be a slot or a minislot.

Figure 4:
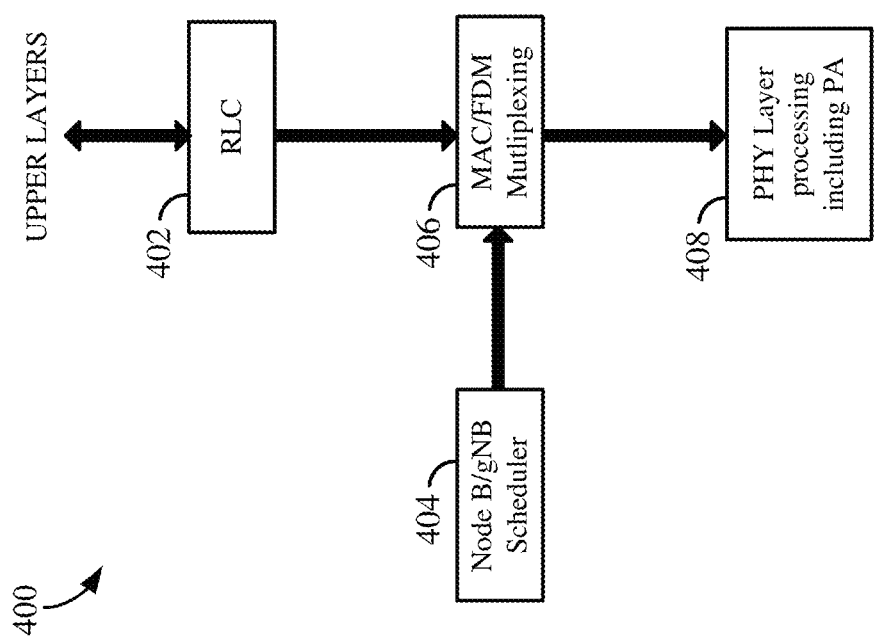
FIG. 4 is a block schematic illustration of a scheduling process blocks in a scheduling entity, Node B, or gNB.

An exemplary block schematic shown in FIG. 4 illustrates an apparatus or arrangement 400 implementable within a Node B or gNB that effectuates scheduling, including FDM scheduling, and further that may implement the scheduling to account for and restrict FDM based on parameters and factors as discussed above. As illustrated, the apparatus 400 includes an Radio Link Control (RLC) 402 that interfaces with upper layers in the Node B or gNB and controls the MAC layer multiplexing as illustrated by block 406. A scheduler 404 inputs controls/restrictions to the multiplying controller 406 and may implement the various FDM restrictions or controls and FDM schemes as discussed herein. Finally, the apparatus includes a physical layer (PHY) processing, which includes the PA in an RF section (not shown) of the Node B.

In one aspect, the parameter restriction may be performed over a whole TTI. For example, a Node B or gNB scheduler may be configured to schedule a lower rank for the Physical Downlink Shared Channel (PDSCH) in a slot when two UEs are frequency division multiplexed. Of further note here, with such gNB scheduler implementations, this scheduled lower rank may be transparent to UEs, meaning that the UE does not need to know about other frequency division multiplexed UEs, thus not increasing UE complexity or giving rise to the need for any further signaling to the UE.

Figure 5:
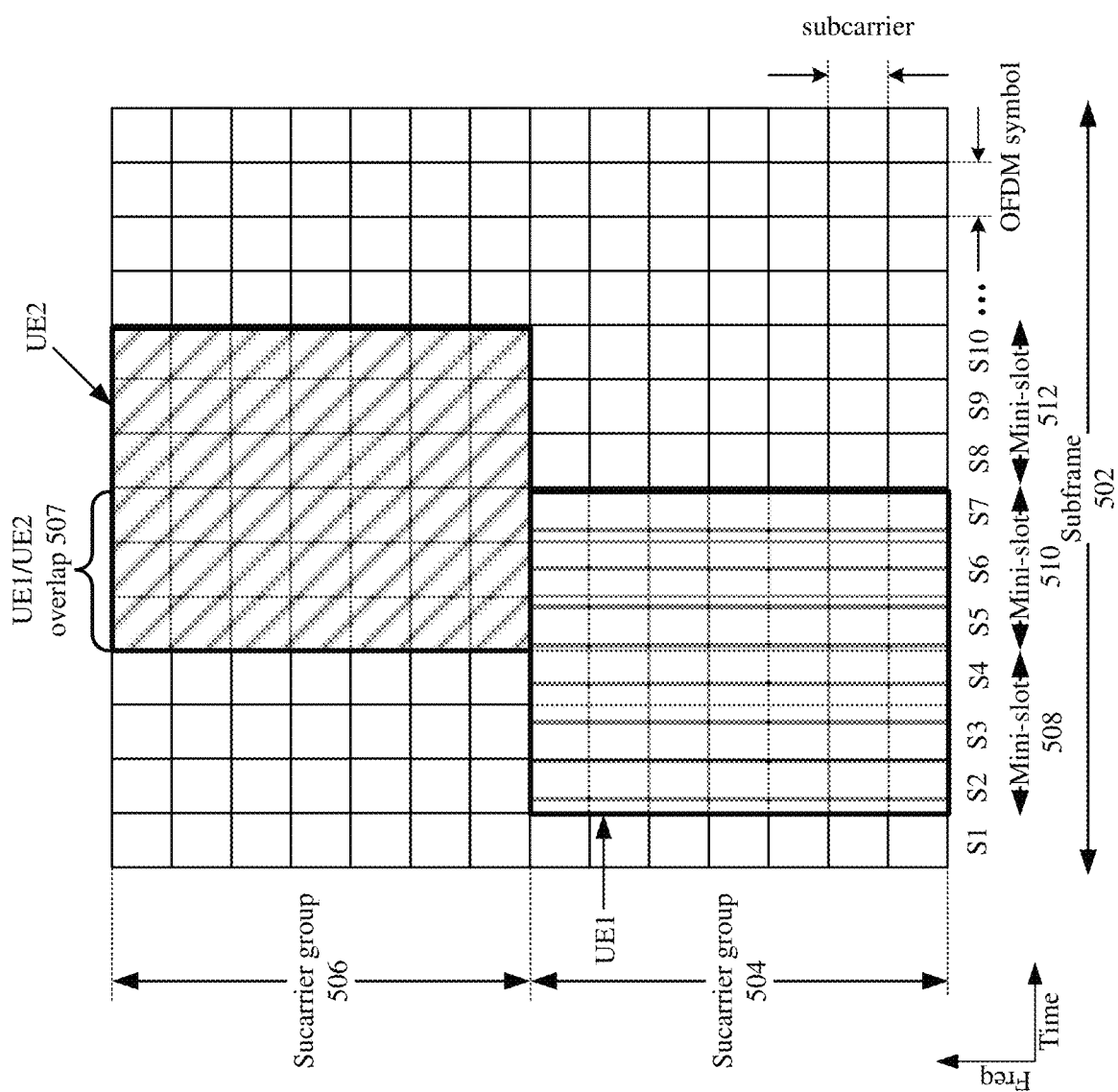
FIG. 5 is a schematic diagram illustrating an exemplary time-frequency resource grid showing frequency division multiplexing according to aspects of the present disclosure.

According to another aspect, the gNB scheduler may restrict the various parameters on a partial TTI basis. Concerning partial TTI scheduling, it is noted that the frequency division multiplexed UEs may have different minislot partitioning, and only a portion of assigned OFDM symbols in the TTI or slot (i.e., some minislots) will have FDM overlap. In a particular aspect, the present methods and apparatus may employ a finer minislot partitioning where each partition (i.e., one or more minislots) becomes effectively like a whole-TTI case. FIG. 5 illustrates a time-frequency resource grid of a portion of frame (e.g., a subframe 502) that illustrates an example of a different or alternate minislot partitioning. In this example, it is assumed that a first UE (UE1) utilizes or is assigned symbols 2-7 (i.e., symbols S2 through S7) over a first subcarrier group 504 and a second UE (UE2) utilizes symbols 5-10 (i.e., symbols S5 through S10) over a second subcarrier group 506) of a 14 symbol subframe 502. As may be seen in FIG. 5, this scheduling results in an overlap 507 between UE1 and UE2 over symbols 5-7 (i.e., symbols S5-S7). In this case, at least three (3) minislots may be defined with a first minislot 508 consisting of symbols S2-S4, a second minislot 510 consisting of symbols S5-S7 (i.e., the FDM overlapping symbols), and a third minislot 512 consisting of symbols S8-S10. According to the present methodology, the second minislot 510 would be scheduled with restricted parameters to account for the FDM overlap 507.

In example of FIG. 5, there is a possibility for the need for higher scheduling overhead to schedule more minislots. Also, if each minislot has its own DMRS, there will be an associated higher RS overhead and, thus, a need for a way to share the RS across these minislots in order to mitigate the overhead. Additionally, the example of FIG. 5 may also give rise to a coding gain loss due to independently encoded smaller packets. Accordingly, in other aspects the disclosed parameter restriction may be used only for OFDM symbols suffering from FDM overlap. In this example, finer minislot partitioning is used, but is done so with a shared RS (e.g., DMRS) and joint encoding across the minislots. Here in this example the Downlink Control Information (DCI) grant signals overlapping OFDM symbols and restricted parameters for those overlapping symbols. According to still a further aspect, a set of possible configurations of overlapping symbols and/or parameter restriction rules could be Radio Resource Control (RRC) signaled and the DCI could contain an index indicating at least one out of the set of possible configurations. Also, the DMRS used may be different depending on the nature of FDM overlap.

Figure 6:
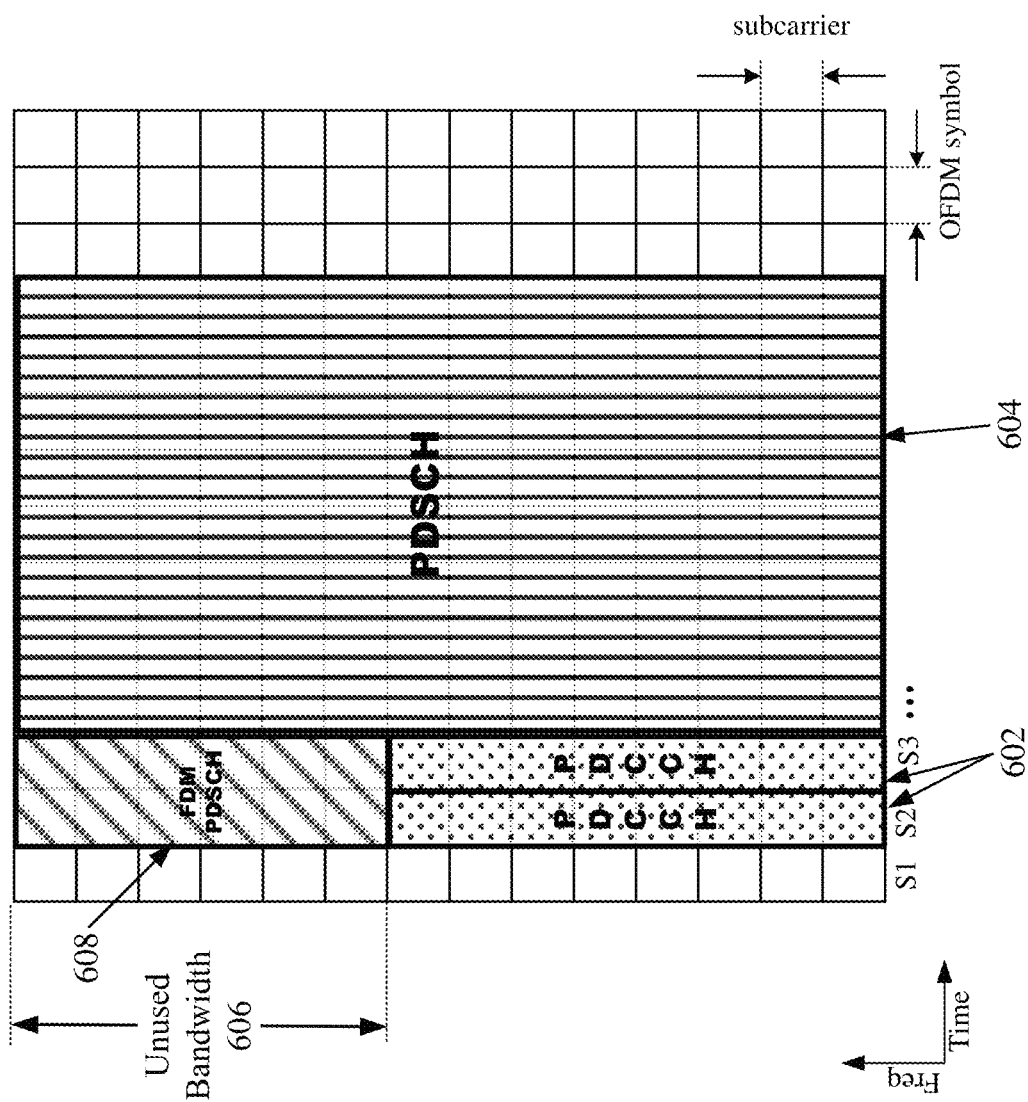
FIG. 6 illustrates a schematic diagram illustrating another exemplary time-frequency resource grid showing frequency division multiplexing according to aspects of the present disclosure.

Particular uses of the present methodology may include the instance where the physical downlink control channel (PDCCH) has a short time duration (e.g., 1 or 2 OFDM symbols), as well as a smaller frequency bandwidth that is, in turn, scheduling a larger frequency bandwidth Physical Downlink shared channel (PDSCH) immediately following in time. FIG. 6 illustrates this example showing that a PDCCH channel 602 occurs prior in time to a PDSCH channel 604, which is shown as having a time duration of two OFDM symbols (e.g., S2 and S3), as merely one example. An unused portion of the bandwidth 606 that exists during the PDCCH duration over slots S2 and S3 can be used for frequency division multiplexing a portion 608 of the PDSCH to a same UE or, alternatively, to other UEs. FIG. 6 is merely one example where the later occurring PDSCH portion 604 is illustrated as being larger in terms of both time duration (e.g., greater than two symbols) and frequency (e.g., using the entire bandwidth illustrated in the "y" dimension). It is noted, however, that the present disclosure is not limited to such a scenario. For example, in other aspects of the present disclosure the bandwidth of the later occurring PDSCH portion 604 may be the same bandwidth as the PDSCH portion 608 frequency division multiplexed with the PDCCH 602. In yet a further aspect, the PDSCH portion 604 may also be a shorter time duration than the PDSCH portion 608 frequency division multiplexed with the PDCCH 602 (e.g., the PDSCH portion 604 may be one symbol duration).

Figure 7:
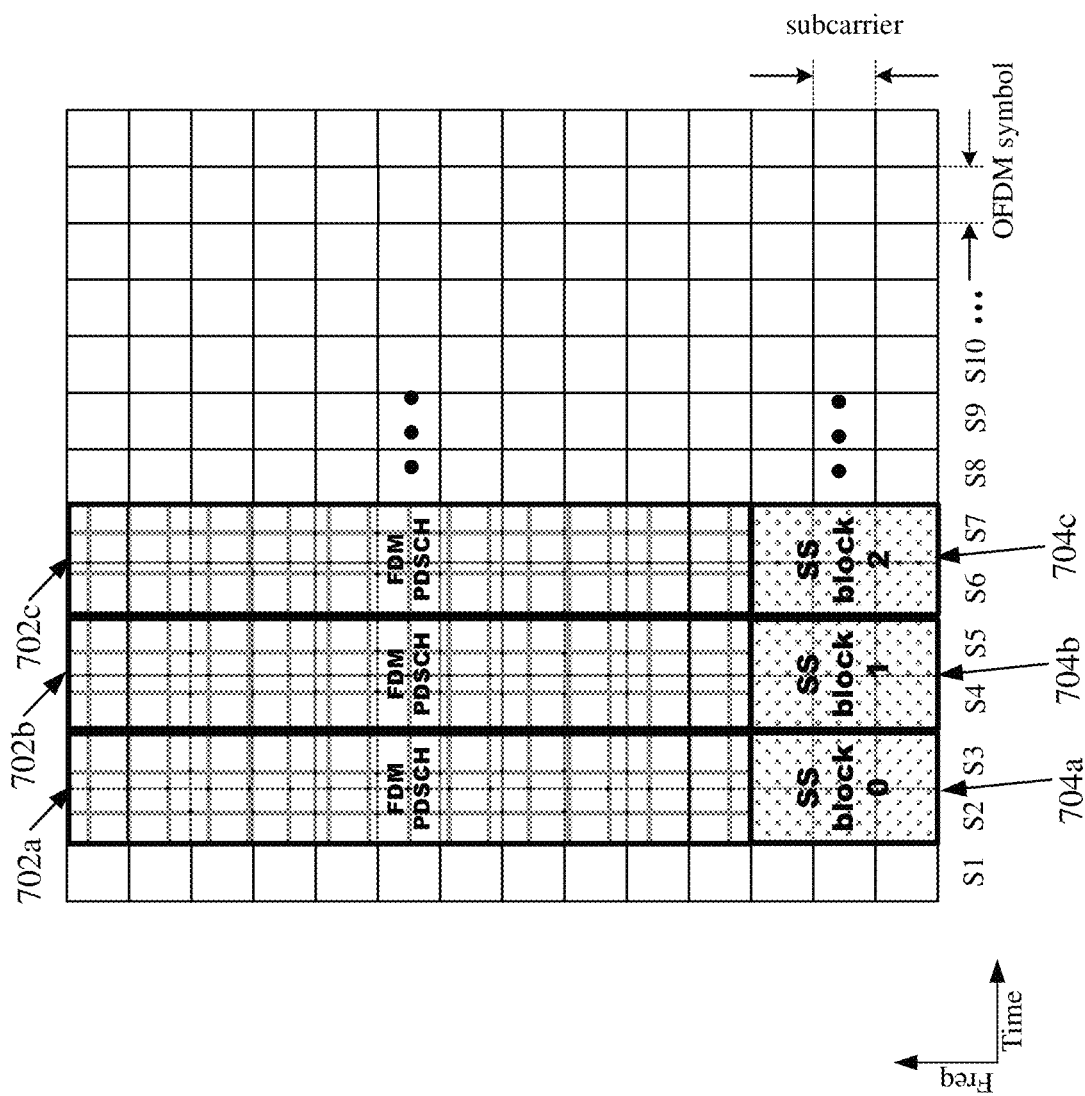
FIG. 7 illustrates a schematic diagram illustrating yet another exemplary time-frequency resource grid showing frequency division multiplexing according to aspects of the present disclosure.

Another use case may involve a synchronization channel (i.e., a Synch channel, which includes one or more of PSS, SSS, and the pBCH) and Synchronization Signal (SS) blocks and the PDSCH, where parameter restriction is performed on a per SS block basis. Since in NR 5G, for example, it has been proposed that the Synch channel is beam-swept, each beam has a Synchronization Signal (SS) block for each of an m number of beam sweep directions. As an illustration of this use case, FIG. 7 show one or more PDSCH channels 702 that may be respectively frequency division multiplexed on each beam, i.e., with each SS block 704. In particular, a PDSCH channel 702a is frequency division multiplexed with a corresponding SS block 0 (i.e., SS block 704a) during the time slots of the SS block (e.g., S2 and S3), a PDSCH channel 702b is frequency division multiplexed with a corresponding SS block 1 (i.e., SS block 704b) during the time slots of the SS block (e.g., S4 and S5), and so forth for each of the m number of beam sweep locations.

It is noted that in an aspect of the example of FIG. 7, the PDSCH on each beam may need its own FDM DMRS. Thus, in this case it may be more desirable to treat each frequency division multiplexed synch channel SS block and the restricted PDSCH as a distinct TTI, which in this case is the time duration of one beam. Thus, application of the present methodology of restricting parameters could then include essentially restricting parameters based on a whole or entire TTI basis, as was discussed previously. In another aspect, a TTI may also span multiple beams with joint coding across all beams where each beam has its own DMRS. There may also be a use case where a separate RS or DMRS is not needed, where last beam in the sweep (i.e., the $m^{th}$ SS block) is the same as that used for the PDSCH that immediately follows. This situation would then be similar to the case of frequency division multiplexed PDCCH and PDSCH channels as discussed above.

Figure 8:
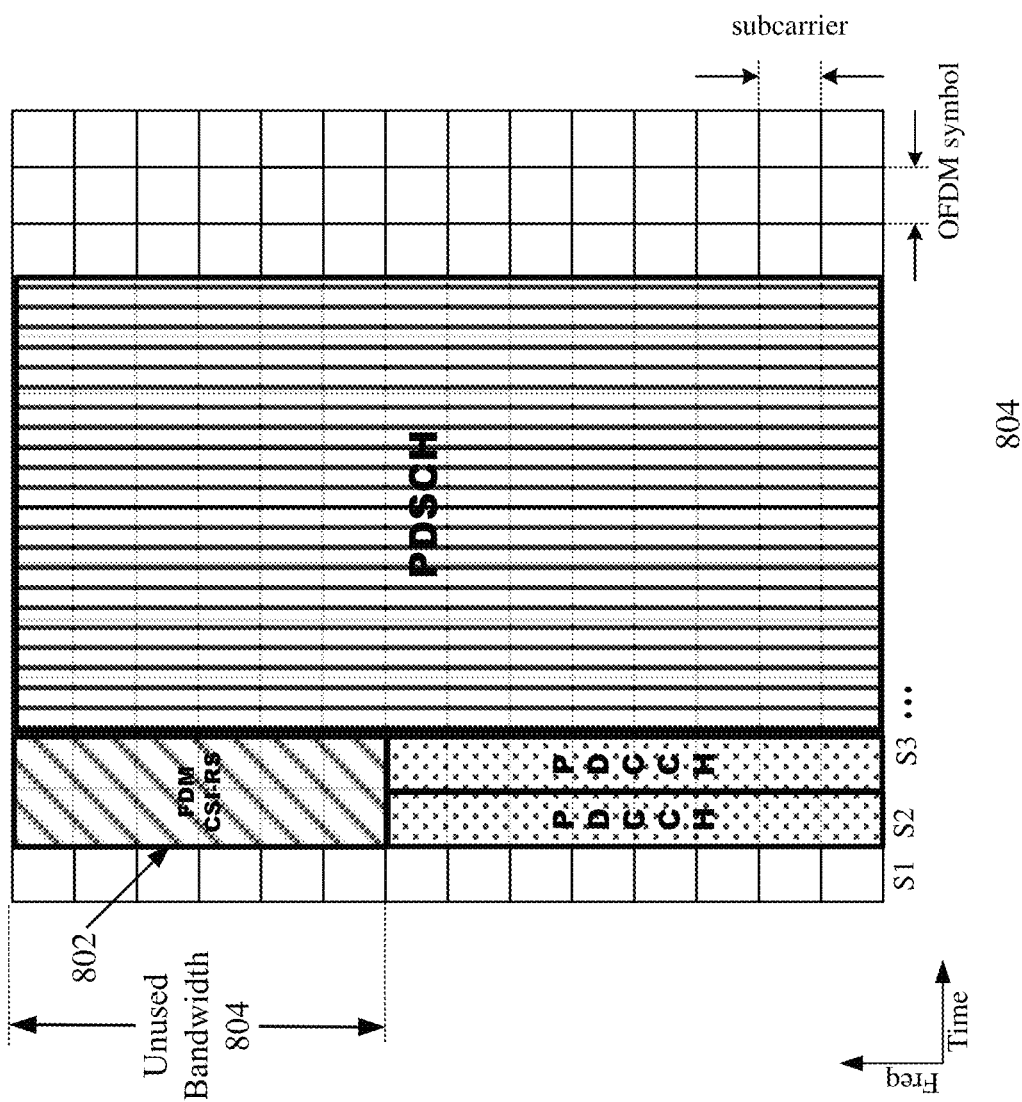
FIG. 8 illustrates a schematic diagram illustrating still another exemplary time-frequency resource grid showing frequency division multiplexing according to aspects of the present disclosure.

In yet another use scenario, the present methodology may be applied to a case where the Channel State Information-Reference Signal (CSI-RS) may be Frequency Division multiplexed with the PDSCH. In certain cases, CSI-RS is not beam-swept, and frequency division multiplexing of the PDSCH and PDCCH with the CSI-RS would be situation could be similar to example discussed above with respect to FIG. 6. FIG. 8 provides an illustration of such an example with the CSI-RS being frequency multiplexed with the PDCCH in the unused bandwidth 804.

Figure 9:
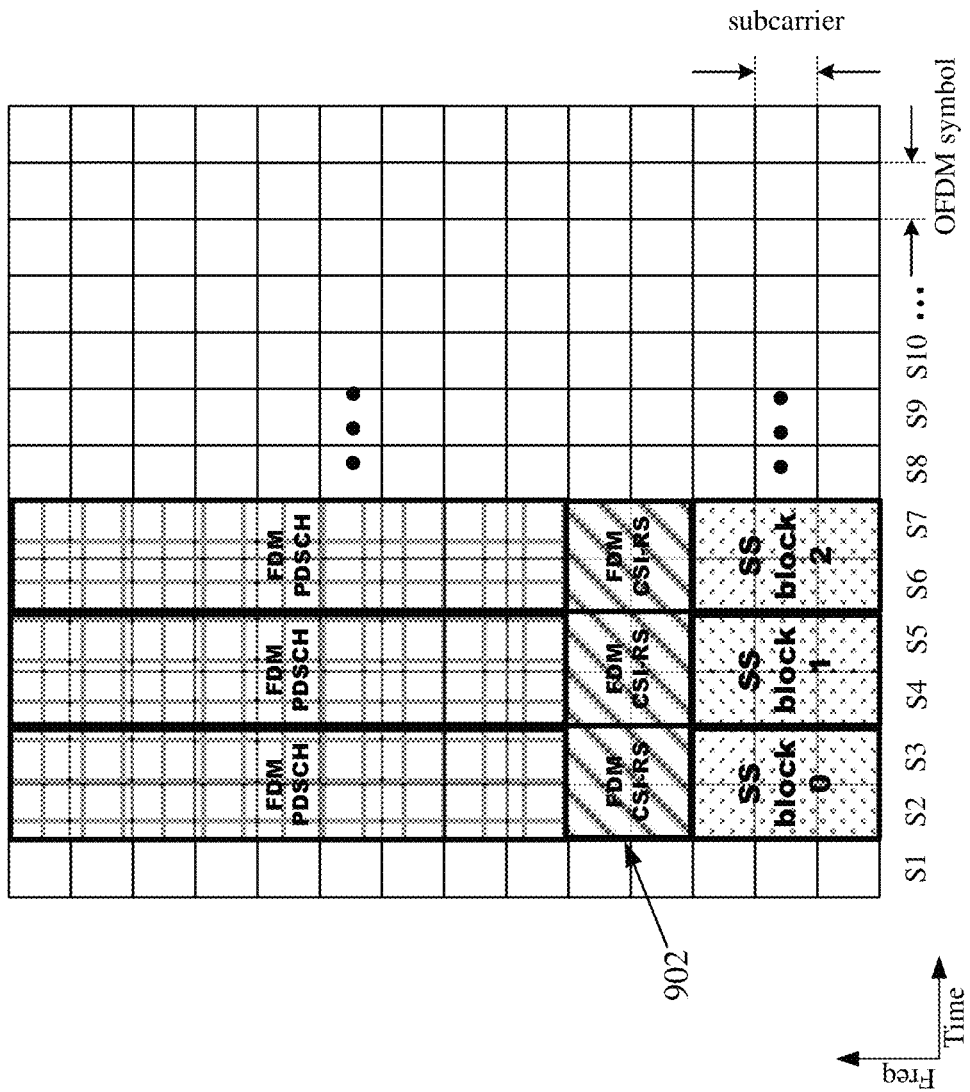
FIG. 9 illustrates a schematic diagram illustrating a further exemplary time-frequency resource grid showing frequency division multiplexing according to aspects of the present disclosure.

In more typical cases, the CSI-RS will be beam-swept similar to the synch channel as was illustrated in the example of FIG. 7. Thus, FIG. 9 provides an illustration of one example of CSI-RS (e.g., 902) frequency division multiplexed with the PDSCH for each beam sweep also corresponding with each SS block. It is noted that the CSI-RS signal and SS blocks are shown over two symbols, but the disclosure is not limited to such, for example, the CSI-RS or the SS blocks or both may be only over one symbol, or alternatively over more than two symbols. It is noted that although FIG. 9 illustrates an example where the SS blocks are frequency division multiplexed with CSI-RS and the PDSCH (i.e., PDSCH+SS+CSI-RS), the present disclosure contemplates various other combinations such as frequency division multiplexed with the SS (PDSCH+SS) as illustrated in FIG. 7. Further combinations may include the PDSCH frequency division multiplexed with the CSI-RS (PDSCH+CSI-RS), which is not specifically illustrated herein.

It is also noted that the disclosed parameter restriction may be useful to not only minimize the PAPR increase resulting from FDM, but also to account for increased inter-symbol interference on symbols using a smaller cyclic prefix duration, for example. The restricted parameter values may implicitly depend on the cyclic prefix durations in use in the first symbol and the later symbols. This applies not only to the above-discussed cases of the synch channel, but also to PDCCH or CSI-RS as well. Due to numerology considerations, it is possible for example, that the first OFDM symbol in certain 'regular' slots (i.e., slots that are not synch-channel slots) has a longer cyclic prefix.

Figure 10:
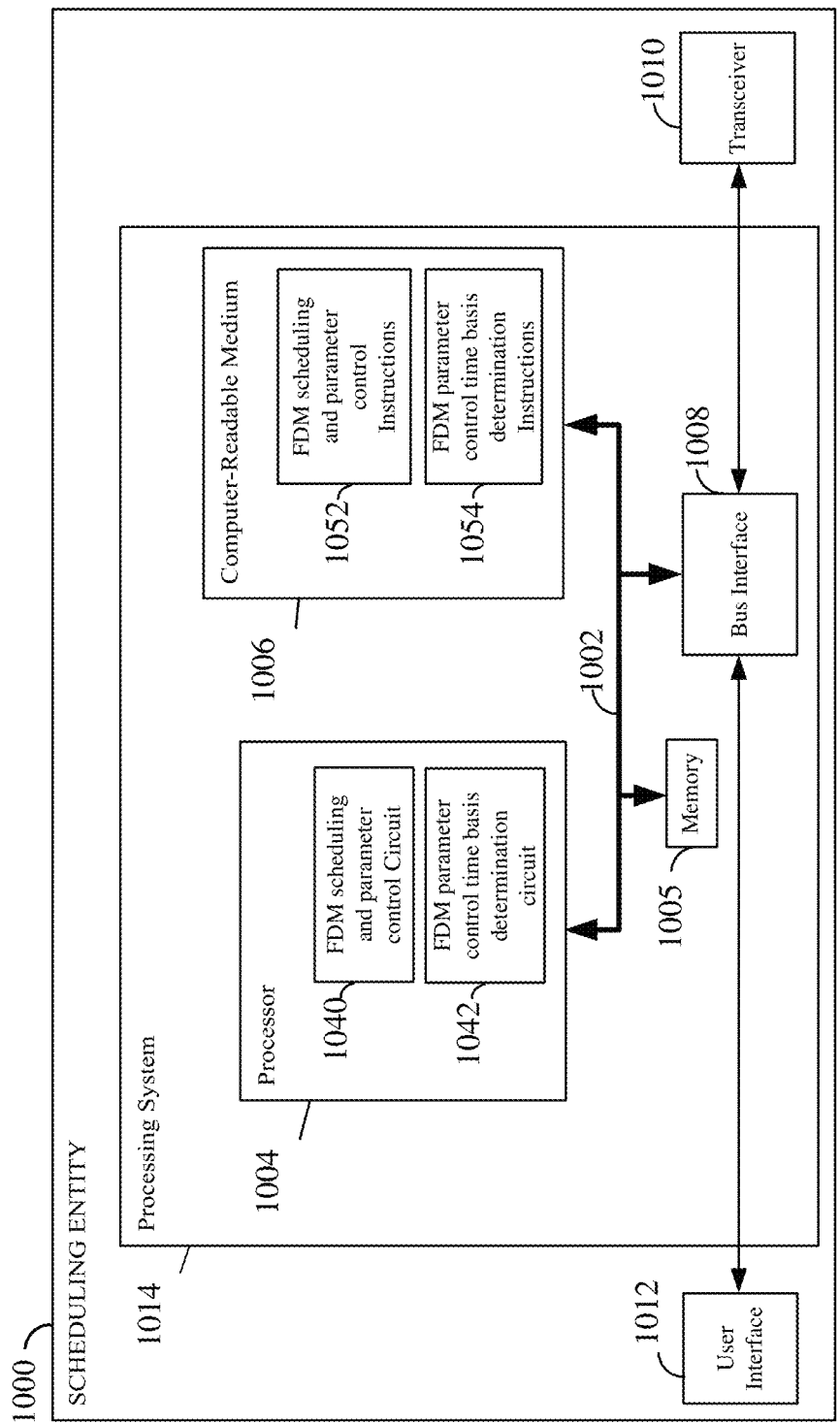
FIG. 10 is a block diagram illustrating an example of a hardware implementation for an apparatus employing a processing system in a scheduling entity, Node B, or gNB.

FIG. 10 is a block diagram illustrating an example of a hardware implementation for a scheduling entity 1000 employing a processing system 1014. For example, the scheduling entity 1000 may be a user equipment (UE) as illustrated in any one or more of FIGS. 1 and 2. In another example, the scheduling entity 1000 may be a base station as illustrated in any one or more of FIGS. 1 and 2.

The scheduling entity 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1000 may be configured to perform any one or more of the functions described herein. That is, the processor 1004, as utilized in a scheduling entity 1000, may be used to implement any one or more of the processes and procedures described herein.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a communication interface or means for communicating with various other apparatus over a transmission medium. Depending upon the nature of the apparatus, a user interface 1012 (e.g., keypad, display, speaker, microphone, joystick) may also be provided.

In some aspects of the disclosure, the processor 1004 may include circuitry 1040 configured for various functions, including, for example, FDM parameter control or restriction. For example, the circuitry 1040 may be configured to implement one or more of the functions described herein in relation to FIGS. 4-9, as well as FIG. 12 including, e.g., block 1202. Processor 1004 may also include circuitry 1042 configured for determining the time basis for the FDM parameter control or restriction, such as was discussed previously and illustrated in connection with FIGS. 4-9.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006. The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1006 may include software 1052 configured for various functions, including, for example FDM parameter control or restriction. For example, the software 1052 may be configured to implement one or more of the functions described above in relation to FIGS. 4-9 and FIG. 12, including, e.g., block 1202. Furthermore, medium 1006 may include FDM parameter control time basis determination instructions 1054 to cause the processor 1004 to further determine the time basis for FDM restriction as illustrated in FIGS. 4-9, for example.

In an aspect, the computer-readable storage medium 1006 may constitute a non-transitory computer-readable medium for storing computer-executable code. The code may be configured to cause a computer or processor to schedule frequency division multiplexed (FDM) symbols, wherein the scheduling of the FDM symbols is selectively based on one or more waveform parameters during a time interval when the FDM symbols are transmitted. Additionally, the code may be configured to cause a computer or processor to transmit the FDM symbols over the time interval. Additionally, the scheduling of the FDM symbols based on the one or more parameters may include restricting a range of possible values of the one or more parameters for the time interval over which FDM transmissions occur.

In a further aspect, the computer-readable medium 1006 may also include code for causing a computer to restrict a range of possible values of the one or more parameters for a time duration equal to an entire duration of transmission including one or more of a transmission time interval (TTI), a slot, a plurality of minislots, a minislot, or portions thereof. The one or more parameters may include one or more of a number of waveforms to be frequency division multiplexed, a rank of one or more waveforms to be frequency division multiplexed, a modulation order of one or more waveforms to be frequency division multiplexed, the bandwidth of one or more of the waveforms to be frequency division multiplexed, frequency separation between at least two of the waveforms to be frequency division multiplexed, the numerologies of one or more waveforms to be frequency division multiplexed, or the waveforms to be frequency division multiplexed.

In still a further aspect, the computer-readable medium 1006 may be configured to cause a computer to schedule frequency division multiplexing of a portion of a Physical Downlink shared channel (PDSCH) with a physical downlink control channel (PDCCH) during a time duration of the PDCCH occurring prior in time to a later portion of the PDSCH and including restricting a range of possible values of the one or more parameters for the time duration of the PDCCH. In other aspects, the code may cause a computer to schedule frequency division multiplexing of a portion of a Physical Downlink shared channel (PDSCH) with one of: (a) a synchronization signal (SS) block during at least a portion of the time duration of the SS block; or (b) a Channel State Information-Reference Signal (CSI-RS) during at least a portion of the time duration of the CSI-RS.

Figure 11:
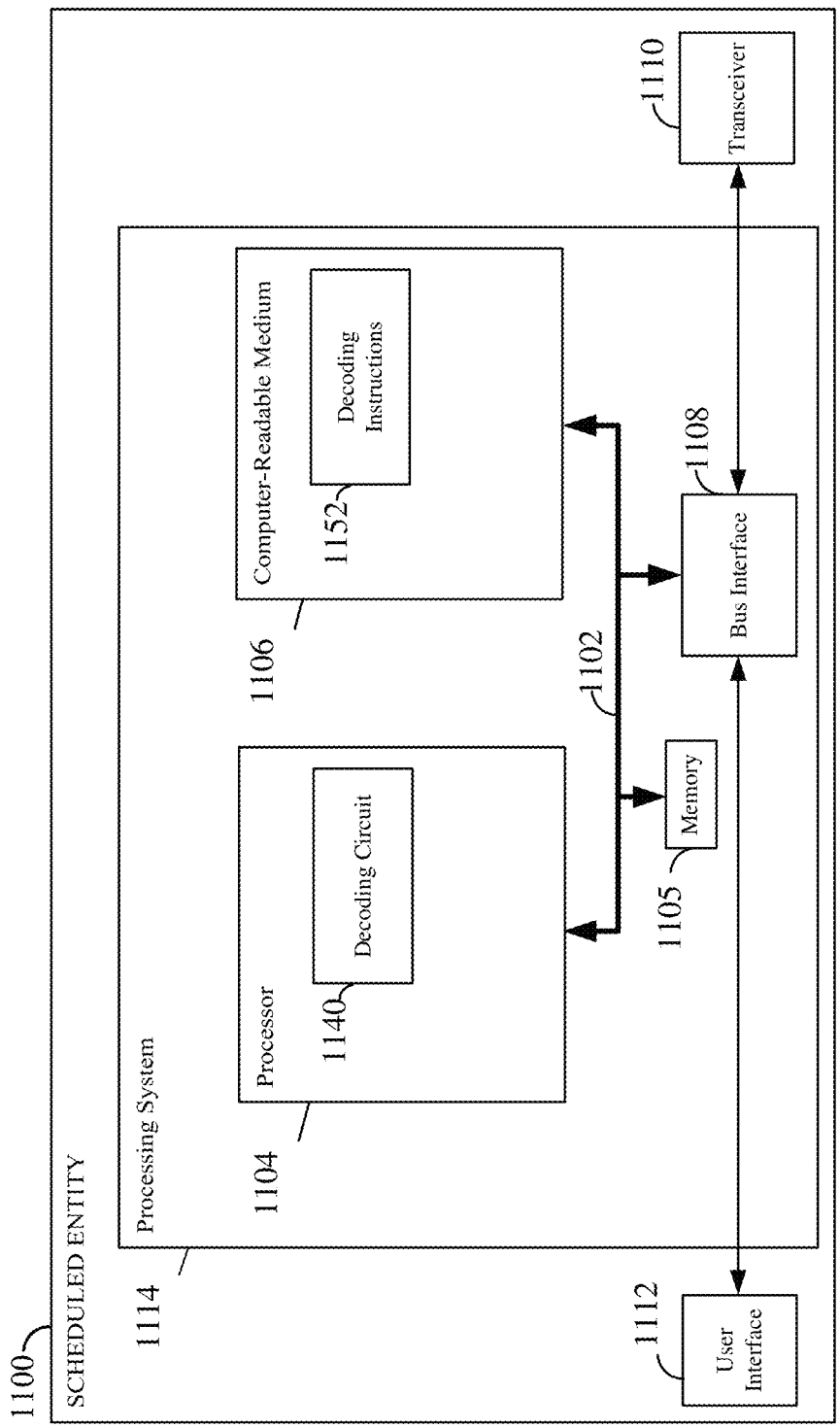
FIG. 11 is a block diagram illustrating an example of a hardware implementation for an apparatus employing a processing system in a scheduled entity or UE.

FIG. 11 is a conceptual diagram illustrating an example of a hardware implementation for an exemplary scheduled entity 1100 employing a processing system 1114. In accordance with various aspects of the disclosure, an element, or any portion of an element, or any combination of elements may be implemented with the processing system 1114 that includes one or more processors 1104. For example, the scheduled entity 1100 may be a user equipment (UE) as illustrated in any one or more of FIGS. 1 and 2.

The processing system 1114 may be substantially the same as the processing system 1014 illustrated in FIG. 10, including a bus interface 1108, a bus 1102, memory 1105, a processor 1104, and a computer-readable medium 1106. Furthermore, the scheduled entity 1100 may include a user interface 1112 and a transceiver 1110 substantially similar to those described above in FIG. 10. That is, the processor 1104, as utilized in a scheduled entity 1100, may be used to implement any one or more of the processes described below and illustrated in FIG. 9.

In some aspects of the disclosure, the processor 1104 may include circuitry 1140 configured for various functions, including, for example, decoding FDM waveforms. Additionally, medium 1106 include instructions or code 1152 for causing synch channel waveform selection determination by the processor 1104, as one example, including decoding FDM waveforms as discussed herein.

Figure 12:
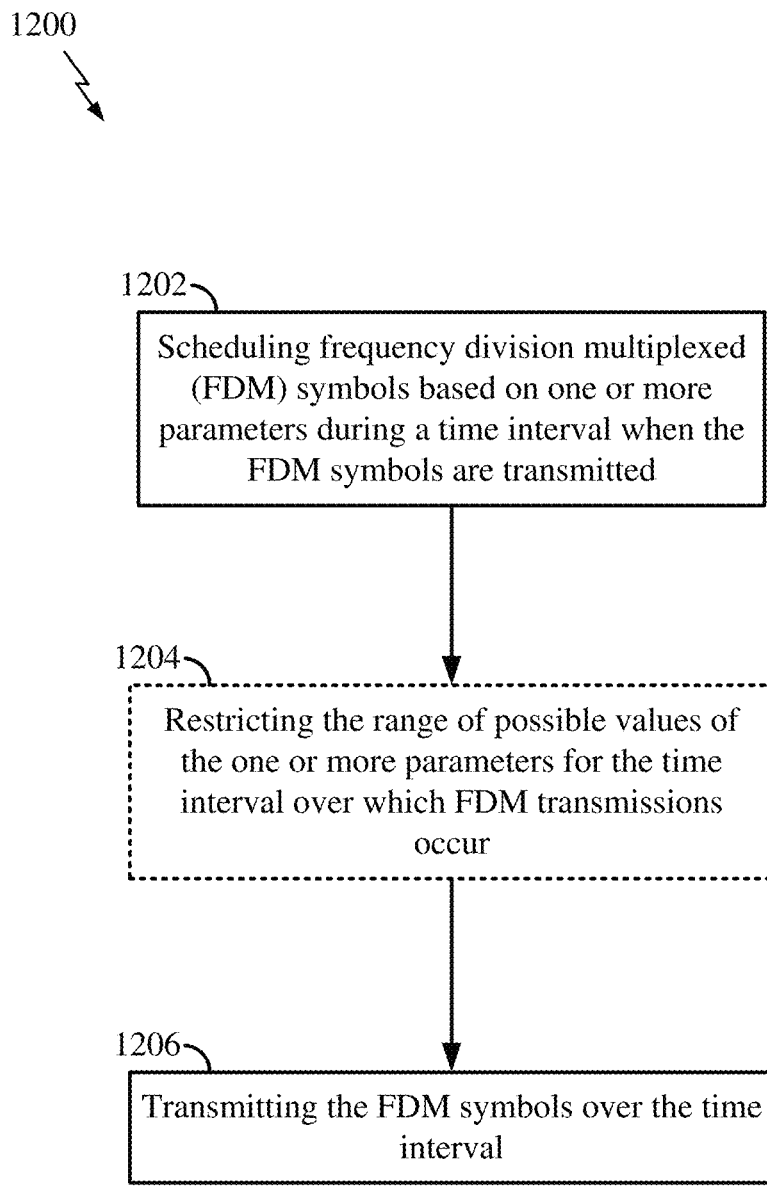
FIG. 12 illustrates a flow diagram of an exemplary method according to aspects of the present disclosure.

FIG. 12 is a flow chart illustrating an exemplary method 1200 for scheduling frequency division multiplexing (FDM) symbols. Method 1200 includes including restricting, limiting or controlling parameters in accordance with some aspects of the present disclosure. Some or all illustrated features may be omitted in a particular implementation within the scope of the present disclosure, and some illustrated features may not be required for implementation of all embodiments. In some examples, the process 1200 may be carried out by the scheduling entity 1000 illustrated in FIG. 10. In some examples, the process 1200 may be carried out by any suitable apparatus or means for carrying out the functions or algorithm described below.

At block 1202, method 1200 includes scheduling frequency division multiplexed (FDM) symbols based on one or more waveform parameters during a time interval when the FDM symbols are transmitted. Although shown as a separate alternative process, process 1202 may further include restricting or limiting a range of possible values of the one or more parameters for the time interval over which FDM transmissions occur. According to another aspect, method 1200 may also include determining a time duration or time interval in which the restricting or limiting of parameters is effectuated. In an example, the one or more parameters may include, but are not limited to: (a) a number of waveforms to be frequency division multiplexed; (b) a rank of one or more waveforms to be frequency division multiplexed; (c) a modulation order of one or more waveforms to be frequency division multiplexed; (d) the bandwidth of one or more of the waveforms to be frequency division multiplexed; (e) frequency separation between at least two of the waveforms to be frequency division multiplexed; (f) the numerologies (e.g., subcarrier spacing or cyclic prefix or both) of one or more waveforms to be frequency division multiplexed; (g) the physical channels carried by the waveforms to be frequency division multiplexed; or (h) the waveforms to be frequency division multiplexed.

Furthermore, method 1200, and process 1204, in particular, may include restricting the range of possible values of the one or more parameters for a time duration equal to an entire duration of transmission including one or more of a transmission time interval (TTI), a slot, a plurality of minislots, or a minislot. In other aspects, method 1200 may include restricting a range of possible values of the one or more parameters for a time duration equal to at least a portion of a duration of transmission including a portion of an entire transmission time interval (TTI), a portion of a slot, or a portion of a plurality of minislots.

Method 1200 may also include determining an alternate minislot partitioning of the plurality into two or more minislot groupings for a plurality of minislots, wherein limiting or restricting the range of possible values of the one or more parameters is only performed for minislot groupings where FDM overlapping of symbols occurs, as was illustrated in FIG. 5, as one example. The methodology may further include signaling at least one of a set of possible configurations of overlapping symbols or parameter restriction rules with a Radio Resource Control (RRC). In yet a further example, signaling of the possible configuration may comprise a Downlink Control Information (DCI) signal that including an index indicating one out of the set of possible configurations.

In still some other aspects, method 1200 may also include scheduling frequency division multiplexing of a portion of a Physical Downlink shared channel (PDSCH) with a physical downlink control channel (PDCCH) during a time duration of the PDCCH occurring prior in time to a later portion of the PDSCH. This may include restricting a range of possible values of the one or more parameters for the time duration of the PDCCH. In yet another aspect, method 1200 may include scheduling frequency division multiplexing of a portion of a Physical Downlink shared channel (PDSCH) with one of: (a) a synchronization signal (SS) block during at least a portion of the time duration of the SS block; or (b) a Channel State Information-Reference Signal (CSI-RS) during at least a portion of the time duration of the CSI-RS.

Figure 13:
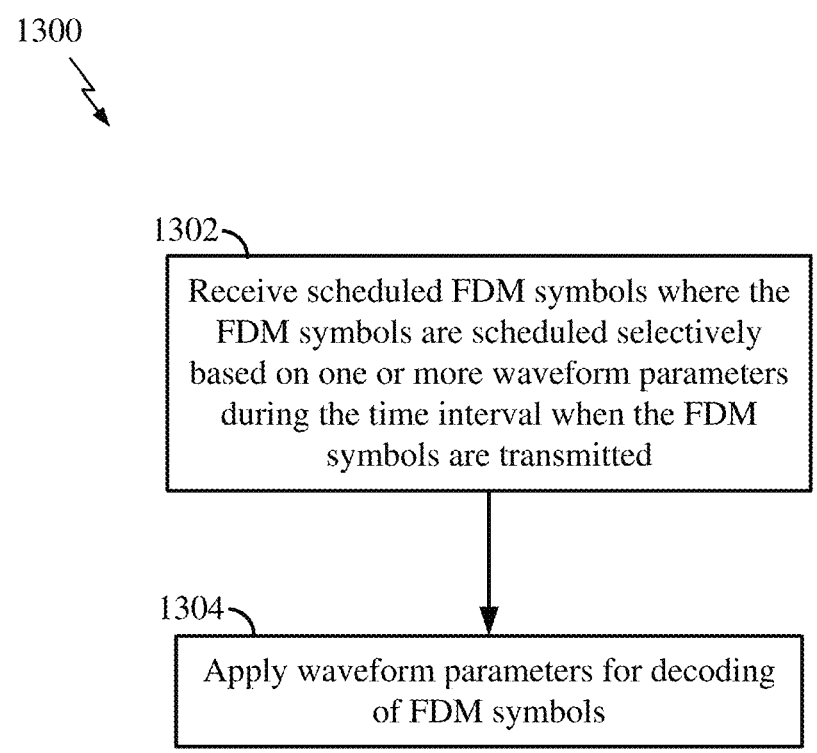
FIG. 13 illustrates a flow diagram of another exemplary method according to aspects of the present disclosure.

FIG. 13 is a flow chart illustrating an exemplary method 1300 for receiving frequency division multiplexing (FDM) symbols, such as FDM symbols configured and transmitted according to method 1200 disclosed in connection with FIG. 12. Method 1300 may be implemented in a mobile device such as a scheduled entity (e.g., 1100) or a UE receiving scheduled FDM symbols where the FDM symbols are scheduled based on one or more waveform parameters. In particular, method 1300 includes receiving scheduled FDM symbols where the FDM symbols are scheduled selectively based on one or more waveform parameters during the time interval when the FDM symbols are transmitted as shown in block 1302. In an aspect, the processes of block 1302 may further include receiving a grant indicating that the signals comprise FDM symbols of multiple transmissions over some portion of the grant.

Additionally, method 1300 includes applying the waveform parameters for decoding of FDM symbols as shown at block 1304. The scheduling of the waveform parameters includes restricting a range of possible values of the one or more parameters for the time interval over which FDM transmissions occur. Moreover, the scheduling of the FDM symbols includes restricting a range of possible values of the one or more parameters for a time duration equal to an entire duration of transmission including one or more of a transmission time interval (TTI), a slot, a plurality of slots, a minislot, or a plurality of minislots.

In an example, the one or more parameters may include, but are not limited to: (a) a number of waveforms to be frequency division multiplexed; (b) a rank of one or more waveforms to be frequency division multiplexed; (c) a modulation order of one or more waveforms to be frequency division multiplexed; (d) the bandwidth of one or more of the waveforms to be frequency division multiplexed; (e) frequency separation between at least two of the waveforms to be frequency division multiplexed; (f) the numerologies (e.g., subcarrier spacing or cyclic prefix or both) of one or more waveforms to be frequency division multiplexed; (g) the physical channels carried by the waveforms to be frequency division multiplexed; or (h) the waveforms to be frequency division multiplexed.

Method 1300 may also include receiving signaling at the receiver of at least one of a set of possible configurations of overlapping symbols or parameter restriction rules with a Radio Resource Control (RRC). Still further, method 1300 may include scheduled frequency division multiplexing of a portion of a Physical Downlink shared channel (PDSCH) with a physical downlink control channel (PDCCH) during a time duration of the PDCCH occurring prior in time to a later portion of the PDSCH and including restricting a range of possible values of the one or more parameters for the time duration of the PDCCH. Additionally, in another aspect the scheduling includes scheduling frequency division multiplexing of a portion of a Physical Downlink shared channel (PDSCH) with one of: (a) a synchronization signal (SS) block during at least a portion of the time duration of the SS block; or (b) a Channel State Information-Reference Signal (CSI-RS) during at least a portion of the time duration of the CSI-RS. Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated in herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising, at a scheduling device:
    scheduling frequency division multiplexed (FDM) symbols, wherein the scheduling of the FDM symbols is based on one or more waveform parameters during a time interval when the FDM symbols are transmitted;
    determining an alternate minislot partitioning for at least two minislot groupings of a plurality of minislots;
    in response to a determination that FDM overlapping of symbols will occur for the at least two minislot groupings, restricting a range of possible values of the one or more waveform parameters for a time duration that is equal to at least a portion of a duration of transmission including at least one of a portion of an entire transmission time interval (TTI), or a portion of a slot, or a portion of the plurality of minislots, or a portion of a minislot; and
    transmitting the FDM symbols over the time interval.

2. The method of claim 1, wherein the one or more waveform parameters includes one or more of:
    (a) a number of waveforms to be frequency division multiplexed;
    (b) a rank of one or more waveforms to be frequency division multiplexed;
    (c) a modulation order of one or more waveforms to be frequency division multiplexed;
    (d) the bandwidth of one or more of the waveforms to be frequency division multiplexed;
    (e) frequency separation between at least two of the waveforms to be frequency division multiplexed;
    (f) the numerologies of one or more waveforms to be frequency division multiplexed;
    (g) the physical channels carried by the waveforms to be frequency division multiplexed; or
    (h) the waveforms to be frequency division multiplexed.

3. The method of claim 1, further comprising, at the scheduling device:
    signaling at least one of a set of possible configurations of overlapping symbols or parameter restriction rules with a Radio Resource Control (RRC).

4. The method of claim 3, the signaling further comprising Downlink Control Information (DCI) including an index indicating at least one out of the set of possible configurations.

5. The method of claim 1, further comprising, at the scheduling device:
    scheduling frequency division multiplexing of a portion of a Physical Downlink shared channel (PDSCH) with a physical downlink control channel (PDCCH) during a time duration of the PDCCH that occurs prior in time to a later portion of the PDSCH; and restricting a range of possible values of the one or more waveform parameters for the time duration of the PDCCH.

6. The method of claim 1, further comprising, at the scheduling device:

scheduling frequency division multiplexing of a portion of a Physical Downlink shared channel (PDSCH) with one of:
  (a) a synchronization signal (SS) block during at least a portion of the time duration of the SS block; or
  (b) a Channel State Information-Reference Signal (CSI-RS) during at least a portion of the time duration of the CSI-RS.

7. An apparatus for wireless communication, comprising:

means for scheduling frequency division multiplexed (FDM) symbols, wherein the scheduling of the FDM symbols is based on one or more waveform parameters during a time interval when the FDM symbols are transmitted;

means for determining an alternate minislot partitioning for at least two minislot groupings of a plurality of minislots;

in response to a determination that FDM overlapping of symbols will occur for the at least two minislot groupings, means for restricting a range of possible values of the one or more waveform parameters for a time duration that is equal to at least a portion of a duration of transmission including at least one of a portion of an entire transmission time interval (TTI), or a portion of a slot, or a portion of the plurality of minislots, or a portion of a minislot; and means for transmitting the FDM symbols over the time interval.

8. The apparatus of claim 7, wherein the one or more waveform parameters includes one or more of:
  (a) a number of waveforms to be frequency division multiplexed;
  (b) a rank of at least one waveform to be frequency division multiplexed;
  (c) a modulation order of one or more waveforms to be frequency division multiplexed;
  (d) the bandwidth of one or more of the waveforms to be frequency division multiplexed;
  (e) frequency separation between at least two of the waveforms to be frequency division multiplexed;
  (f) the numerologies of one or more waveforms to be frequency division multiplexed;
  (g) the physical channels carried by the waveforms to be frequency division multiplexed; or
  (h) the waveforms to be frequency division multiplexed.

9. The apparatus of claim 7, further comprising:

means for scheduling frequency division multiplexing of a portion of a Physical Downlink shared channel (PDSCH) with a physical downlink control channel (PDCCH) during a time duration of the PDCCH that occurs prior in time to a later portion of the PDSCH; and means for restricting a range of possible values of the one or more waveform parameters for the time duration of the PDCCH.

10. The apparatus of claim 7, further comprising:

means for scheduling frequency division multiplexing of a portion of a Physical Downlink shared channel (PDSCH) with one of:
  (a) a synchronization signal (SS) block during at least a portion of the time duration of the SS block; or
  (b) a Channel State Information-Reference Signal (CSI-RS) during at least a portion of the time duration of the CSI-RS.

11. An apparatus for wireless communication, comprising:

a processor;

a transceiver communicatively coupled to the at least one processor; and a memory communicatively coupled to the at least one processor, wherein the processor is configured to:

schedule frequency division multiplexed (FDM) symbols, wherein the scheduling of the FDM symbols is based on one or more waveform parameters during a time interval when the FDM symbols are transmitted;

determine an alternate minislot partitioning for at least two minislot groupings of a plurality of minislots;

in response to a determination that FDM overlapping of symbols will occur for the at least two minislot groupings, restrict a range of possible values of the one or more waveform parameters for a time duration that is equal to at least a portion of a duration of transmission including at least one of a portion of an entire transmission time interval (TTI), or a portion of a slot, or a portion of the plurality of minislots, or a portion of a minislot; and transmit the FDM symbols over the time interval via the transceiver.

12. The apparatus of claim 11, wherein the one or more waveform parameters includes one or more of:
  (a) a number of waveforms to be frequency division multiplexed;
  (b) a rank of one or more waveforms to be frequency division multiplexed;
  (c) a modulation order of one or more waveforms to be frequency division multiplexed;
  (d) the bandwidth of one or more of the waveforms to be frequency division multiplexed;
  (e) frequency separation between at least two of the waveforms to be frequency division multiplexed;
  (f) the numerologies of one or more waveforms to be frequency division multiplexed;
  (g) the physical channels carried by the waveforms to be frequency division multiplexed; or
  (h) the waveforms to be frequency division multiplexed.

13. The apparatus of claim 11, wherein the processor is further configured to:

schedule frequency division multiplexing of a portion of a Physical Downlink shared channel (PDSCH) with a physical downlink control channel (PDCCH) during a time duration of the PDCCH that occurs prior in time to a later portion of the PDSCH; and restrict a range of possible values of the one or more waveform parameters for the time duration of the PDCCH.

14. The apparatus of claim 11, wherein the processor is further configured to:

schedule frequency division multiplexing of a portion of a Physical Downlink shared channel (PDSCH) with one of:
  (a) a synchronization signal (SS) block during at least a portion of the time duration of the SS block; or (b) a Channel State Information-Reference Signal (CSI-RS) during at least a portion of the time duration of the CSI-RS.

\* \* \* \* \*